US 11,336,434 B2

(12) United States Patent
Peng et al.

(10) Patent No.: US 11,336,434 B2
(45) Date of Patent: May 17, 2022

(54) INTERNET OF THINGS NETWORKING AUTHENTICATION SYSTEM AND METHOD THEREOF

(71) Applicant: REALTEK SEMICONDUCTOR CORP., Hsinchu (TW)

(72) Inventors: Zuo-Hui Peng, Hsinchu (TW); Zhao-Ming Li, Hsinchu (TW); Guo-Feng Zhang, Hsinchu (TW); Cui Ding, Hsinchu (TW); Jing-Jun Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 36 days.

(21) Appl. No.: 16/922,522

(22) Filed: Jul. 7, 2020

(65) Prior Publication Data
US 2021/0297246 A1  Sep. 23, 2021

(30) Foreign Application Priority Data

Mar. 18, 2020  (CN) .......................... 202010190821.1

(51) Int. Cl.
*H04L 9/08* (2006.01)
*H04L 9/06* (2006.01)

(52) U.S. Cl.
CPC .......... *H04L 9/0825* (2013.01); *H04L 9/0643* (2013.01); *H04L 9/0869* (2013.01); *H04L 9/0894* (2013.01)

(58) Field of Classification Search
None
See application file for complete search history.

(56) References Cited

U.S. PATENT DOCUMENTS 10,116,648 B1 * 10/2018 Sharma ............... H04W 12/069
10,536,853 B2 * 1/2020 Vedantham ............. H04W 4/80
(Continued)

FOREIGN PATENT DOCUMENTS

CN   108156644 A   6/2016
CN   107231627 A   10/2017
(Continued)

*Primary Examiner* — Eleni A Shiferaw
*Assistant Examiner* — Bassam A Noaman
(74) *Attorney, Agent, or Firm* — Birch, Stewart, Kolasch & Birch, LLP

(57) ABSTRACT

An Internet of Things (IoT) networking authentication system and a method thereof are provided. The IoT networking authentication system includes an idle IoT apparatus and a networked IoT apparatus. The idle IoT apparatus encrypts a connection request according to a key to generate a connection request ciphertext and sends the connection request ciphertext. The networked IoT apparatus receives the connection request ciphertext and decrypts, according to the key, the connection request ciphertext to obtain the connection request. The networked IoT apparatus authenticates the idle IoT apparatus according to the connection request to generate an authentication result. The networked IoT apparatus determines, according to the authentication result and a networking condition, whether to allow the idle IoT apparatus to join an IoT network, so as to generate a connection response. The networked IoT apparatus outputs the connection response to the idle IoT apparatus.

16 Claims, 7 Drawing Sheets

(56) References Cited

U.S. PATENT DOCUMENTS

| | | | | |
|---|---|---|---|---|
| 2009/0147714 A1* | 6/2009 | Jain | .................. | H04W 52/0216 |
| | | | | 370/311 |
| 2012/0117213 A1* | 5/2012 | Shaffer | ................ | H04L 47/726 |
| | | | | 709/223 |
| 2018/0167955 A1* | 6/2018 | Prakash | ................ | H04W 40/02 |
| 2019/0205541 A1* | 7/2019 | Zimny | ................ | H04L 41/0893 |
| 2019/0268759 A1* | 8/2019 | Targali | .................... | H04W 8/18 |
| 2020/0089545 A1* | 3/2020 | Ahad | ...................... | G06F 9/546 |
| 2020/0296089 A1* | 9/2020 | Hsiung | ................ | H04L 9/3273 |
| 2020/0403992 A1* | 12/2020 | Huffman | ............. | H04L 63/0884 |
| 2021/0022197 A1* | 1/2021 | Chiang | .................. | H04L 65/80 |

FOREIGN PATENT DOCUMENTS

| | | |
|---|---|---|
| CN | 107889119 A | 4/2018 |
| CN | 108199905 A | 6/2018 |
| CN | 108366362 A | 8/2018 |
| CN | 108391238 A | 8/2018 |
| CN | 109495442 A | 3/2019 |
| TW | 201508692 A | 3/2015 |
| WO | WO 2019/157436 A1 | 8/2019 |

\* cited by examiner

INTERNET OF THINGS NETWORKING AUTHENTICATION SYSTEM AND METHOD THEREOF

CROSS-REFERENCE TO RELATED APPLICATION

This non-provisional application claims priority under 35 U.S.C. § 119(a) to Patent Application No. 202010190821.1 filed in China, P.R.C. on Mar. 18, 2020, the entire contents of which are hereby incorporated by reference.

BACKGROUND

Technical Field

The present invention describes a networking technology, an in particular, describes an Internet of Things (IoT) networking authentication system and a method thereof.

Related Art

In today's life, there are many wireless networking devices, and there are increasing demands for connecting a plurality of apparatuses to each other to form a local network. However, in the mesh protocol in the general standard (IEEE 802.11) for traditional wireless local area networks, in order to form a data link among nodes represented by all apparatuses to establish a communicative connection between each other, peer-to-peer connection enabling, peer-to-peer connection confirmation, and four-way handshake are required. Therefore, a large amount of data needs to be transmitted between the nodes and a relatively long time needs to be spent for link establishment.

SUMMARY

In view of the above, the present invention provides an IoT networking authentication system and a method thereof to authenticate an apparatus that requires to join an IoT network, and reduce an amount of data to be transmitted between each other and a link establishment time.

According to some embodiments, the IoT network networking authentication system includes an idle IoT apparatus and a networked IoT apparatus. The idle IoT apparatus is configured to encrypt a connection request according to a key to generate a connection request ciphertext and send the connection request ciphertext. The networked IoT apparatus is configured to: receive the connection request ciphertext, decrypt the connection request ciphertext according to the key to obtain the connection request, authenticate the idle IoT apparatus according to the connection request to generate an authentication result, determine, according to the authentication result and a networking condition, whether to allow the idle IoT apparatus to join an IoT network so as to generate a connection response, and output the connection response to the idle IoT apparatus.

According to some embodiments, the IoT network networking authentication method includes: encrypting, by an idle IoT apparatus, a connection request according to a key to generate a connection request ciphertext; sending, by the idle IoT apparatus, the connection request ciphertext to a networked IoT apparatus; decrypting, by the networked IoT apparatus, the connection request ciphertext according to the key to obtain the connection request; authenticating, by the networked IoT apparatus, the idle IoT apparatus according to the connection request to generate an authentication result; determining, by the networked IoT apparatus according to the authentication result and a networking condition, whether to allow the idle IoT apparatus to join an IoT network so as to generate a connection response; and outputting, by the networked IoT apparatus, the connection response to the idle IoT apparatus.

Therefore, according to some embodiments, the idle IoT apparatus and the networked IoT apparatus have the same key to encrypt and decrypt data transmission data, and the networked IoT apparatus can authenticate the idle IoT apparatus through the key, so that authentication and link establishment can be rapidly performed between the IoT apparatuses. In addition, since only a small amount of data needs to be transmitted to complete the authentication, the amount of data that needs to be transmitted to establish a link between the IoT apparatuses can be reduced.

DETAILED DESCRIPTION

Figure 1:
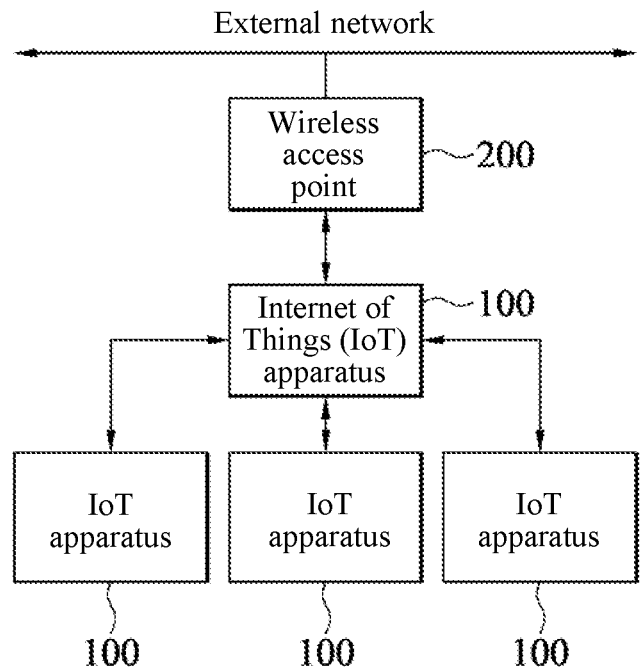
FIG. 1 is a schematic diagram of an architecture of an IoT network according to an embodiment of the present invention.

FIG. 1 is a schematic diagram of an architecture of an IoT network according to an embodiment of the present invention. The IoT network consists of a plurality of IoT apparatuses 100, and is connected to a wireless access point 200 through a tree network topology. Each IoT apparatus 100 serves as a node in the IoT network. A term "networking" is to be described herein, which refers to a process in which the IoT apparatuses 100 form an IoT network.

A term "network configuration" is to be described herein, which means to perform authentication on the IoT apparatuses 100 that are to form an IoT network and perform network configuration on authenticated IoT apparatuses 100 so that the apparatuses can obtain information required for subsequent networking (which is referred to as "network configuration data" below).

Figure 2:
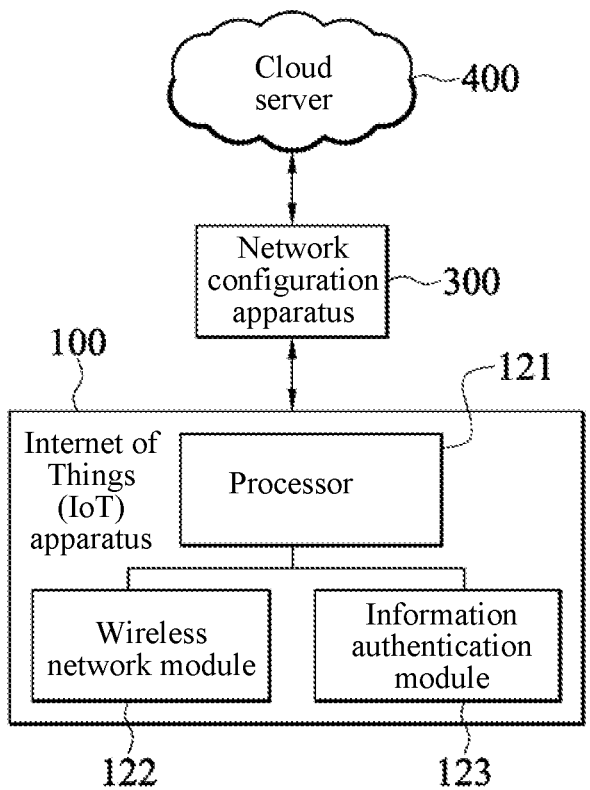
FIG. 2 is a schematic diagram of performing network configuration on an IoT apparatus according to an embodiment of the present invention.

FIG. 2 is a schematic diagram of performing network configuration on an IoT apparatus 100 according to an embodiment of the present invention. A network configuration apparatus 300 is configured to perform authentication and network configuration on the IoT apparatus 100. The IoT apparatus 100 includes a processor 121, a wireless network module 122, and an information authentication module 123. The processor 121 is connected to and controls the wireless network module 122 and the information authentication module 123. The wireless network module 122 may provide a wireless network communication function to wirelessly communicate with other apparatuses and establish a node link. The information authentication module 123 may perform authentication on the network configuration apparatus 300, so that after determining that the IoT apparatus 100 may serve as a node in the IoT network, the network configuration apparatus 300 may send network configuration data to the IoT apparatus 100. The IoT apparatus 100 may be, for example, household appliances (such as a refrigerator or a TV, etc.), but the present invention is not limited thereto. It may be understood that the IoT apparatus 100 may further include other software or hardware components to achieve a specific purpose. For example, a lighting apparatus may further include a light bulb or a lamp tube, or may have a button or a knob that can be used to control brightness. There are numerous types of IoT apparatuses 100. Examples are not enumerated herein. The network configuration apparatus 300 may be mobile apparatuses such as a smart phone, a personal digital assistant (PDA), a tablet computer, and a notebook computer, etc.

In some embodiments, the network configuration apparatus 300 obtains first authentication information of the IoT apparatus 100 from the IoT apparatus 100 in a first information obtaining manner, and obtains second authentication information of the IoT apparatus 100 in a manner different from the first information obtaining manner. When it is recognized that the two pieces of authentication information are the same or are corresponding to each other, it is determined that the authentication succeeds. The first information obtaining manner may be, for example, scanning and decoding a QR code formed by encoding the first authentication information to obtain the first authentication information. The QR code may be provided on a housing of the IoT apparatus 100. Alternatively, the first authentication information is sent to the network configuration apparatus 300 through a short-range wireless communication protocol supported by the information authentication module 123, such as Bluetooth, near field communication (NFC), a wireless hotspot (Wi-Fi), etc.

In some embodiments, the network configuration architecture may further include a cloud server 400 (shown in FIG. 2). The foregoing second information obtaining manner may be, for example, providing the second authentication information to the network configuration apparatus 300 through the cloud server 400.

In some embodiments, the foregoing second information obtaining manner may also be providing the second authentication information to the network configuration apparatus 300 in other manners. For example, a user inputs the second authentication information through an operation interface of the network configuration apparatus 300.

In some embodiments, the first authentication information and the second authentication information are associated with the IoT apparatus 100. For example, both adopt parameters such as a factory serial number, a model number, and a media access control (MAC) address of the IoT apparatus 100, or a variety of parameters may be arranged in a specific way, or further converted according to a specific algorithm, such as an encryption algorithm, a hash algorithm, etc. In some embodiments, one of the first authentication information and the second authentication information adopts an original parameter or combination, and the other adopts a parameter obtained by converting the original parameter or combination according to a specific algorithm.

A term "parent node" is to be described herein, which refers to a node for next transmission of a sending node during uplink transmission of the sending node.

A term "child node" is to be described herein, which refers to a node for next transmission of a sending node during downlink transmission of the sending node.

A term "hop number" is to be described herein, which refers to required times of data delivery between two nodes.

A term "root node" is to be described herein, which refers to a node connected to the wireless access point 200, that is, a first node through which the wireless access point 200 passes to transmit data to the IoT network.

A term "relay node" is to be described herein, which refers to a node with receiving, sending, and forwarding functions, and is connected to a node in an uplink direction of the relay node, and may be connected to other nodes in a downlink direction of the relay node to forward data sent from a parent node and a child node of the relay node.

A term "leaf node" is to be described herein, which refers to a node connected to a node (that is, a parent node) only in an uplink direction. An IoT apparatus 100 without a data transfer capability usually serves as the leaf node, but the present invention is not limited thereto. If necessary, an IoT apparatus 100 capable of serving as a root node or a relay node may also be set as the leaf node.

In some embodiments, the network configuration data includes a service set identifier (SSID) and a password of the wireless access point 200. In some embodiments, the network configuration data includes a node type corresponding to the IoT apparatus 100 (that is, specified as a root node or a leaf node), etc. In some embodiments, the IoT apparatus 100 obtains a key according to the network configuration data during a network configuration stage. The key may be a serial number, a number field generated by a random number generator, etc.

For ease of describing performing of authentication when the IoT apparatuses 100 form an IoT network herein, an IoT apparatus 100 that already serves as a node in the IoT network is referred to as a "networked IoT apparatus". An IoT apparatus that does not serve as a node in the IoT network is referred to as an "idle IoT apparatus".

Figure 3:
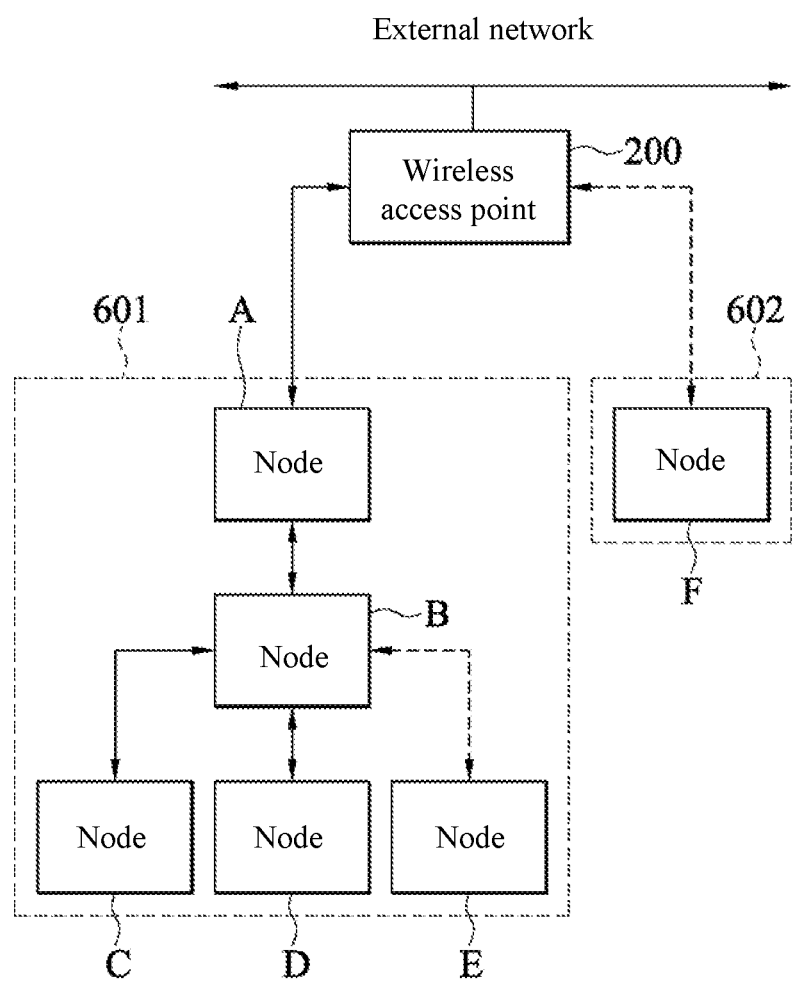
FIG. 3 is a schematic diagram of an architecture of an IoT network according to another embodiment of the present invention.

FIG. 3 is a schematic diagram of an architecture of an IoT network according to another embodiment of the present invention. Compared to FIG. 1, in addition to a tree structure (for example, a tree structure 601), the IoT network in this embodiment may further include another or more tree structures. For example, the IoT network includes another tree structure (for example, a tree structure 602) herein. In other words, the IoT network may include a plurality of tree structures connected to the wireless access point 200, thereby expanding the network coverage. In addition, since the wireless access point 200 is connected to a plurality of root nodes belonging to different tree structures, network stability can be enhanced. In addition, in this network topology, route selection is not required during uplink transmission, and it only needs to forward data to the lower layer nodes according to a routing table during downlink transmission. Thus, a resource burden of each node can be reduced and a data transmission time can be shortened. The tree structure 601 herein includes a plurality of nodes A to D and a node E to serve as a child node of the node B. The tree structure 602 includes a node F to serve as a root node of the tree structure 602.

Figure 4:
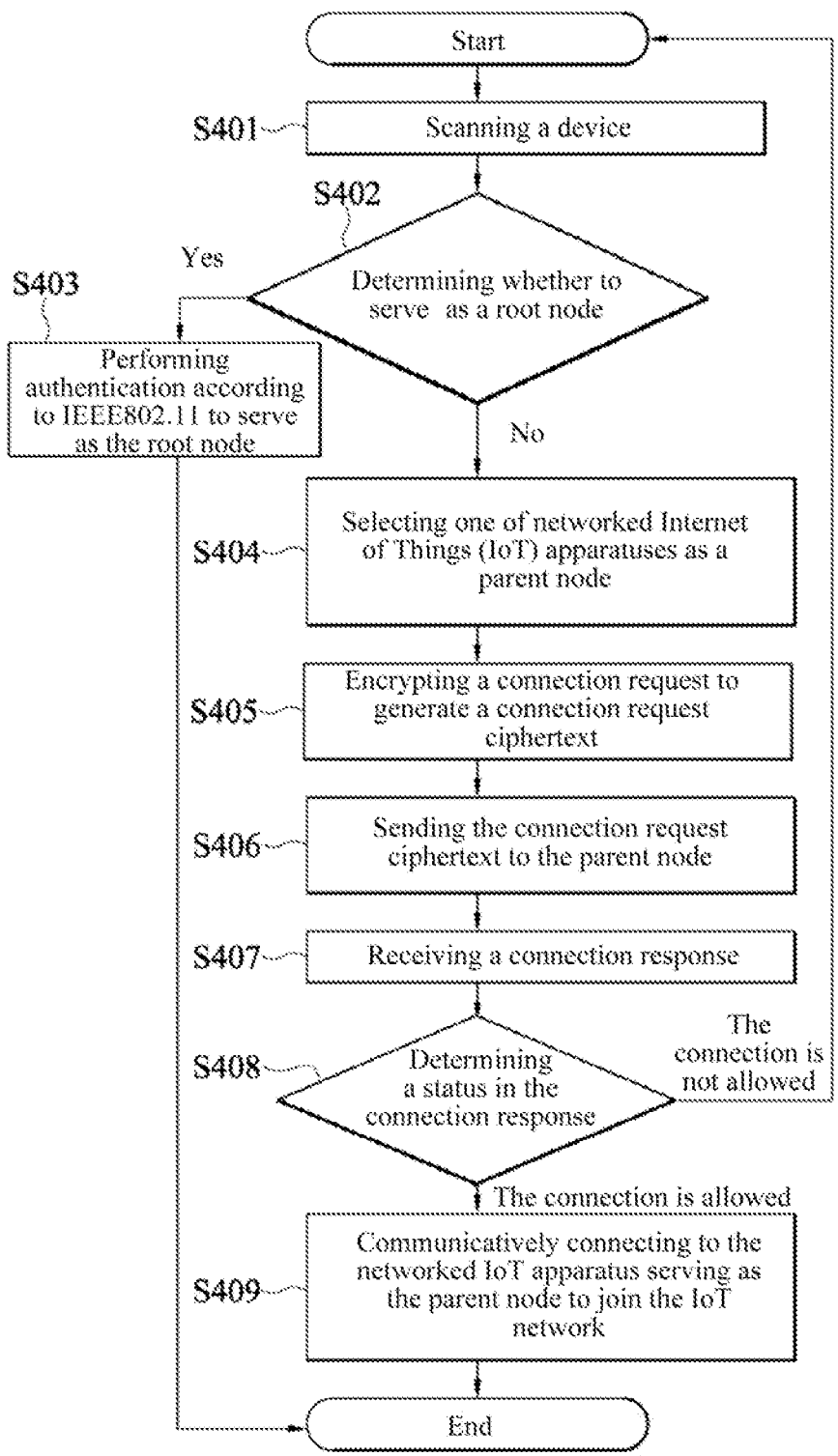
FIG. 4 is a flowchart of networking authentication of an idle IoT apparatus according to an embodiment of the present invention.

FIG. 4 is a flowchart of networking authentication of an idle IoT apparatus according to an embodiment of the present invention. The authentication method is performed by an idle IoT apparatus (for example, the node E) to be authenticated by the networked IoT apparatus. After the authentication succeeds, the idle IoT apparatus may join the IoT network by using the networked IoT apparatus as a parent node (for example, the node B).

Step S401: Scan a device. The idle IoT apparatus scans adjacent devices. The device refers to the wireless access point 200 and the networked IoT apparatus that can form the same IoT network after the foregoing network configuration. The scanned networked IoT apparatus may be a candidate node of the parent node.

Step S402: Determining whether to serve as a root node. If the idle IoT apparatus selects to serve as the root node (for example, the node F) in the tree structure, authentication is performed according to the provisions in the general standard protocol for wireless local area networks (step S403). If the idle IoT apparatus selects to serve as a relay node or a leaf node in the tree structure, for example, serve as a child node (for example, the node E) of a node (for example, the node B), one of the scanned networked IoT apparatuses is selected as the parent node (step S404), and then step S405 is performed so that a network authentication procedure can be proceeded.

In step S405, an idle IoT apparatus encrypts a connection request 54 (to be described in detail later) according to a key to generate a connection request ciphertext 50 (to be described in detail later). Next, the connection request ciphertext 50 is sent to the parent node (step S406), and then step S407 is performed. In some embodiments, the IoT apparatus may obtain the key from the network configuration apparatus 300 during the network configuration stage, for example, obtain the key through the network configuration data.

In step S407, the idle IoT apparatus receives a connection response 60 (to be described in detail later) returned by the networked IoT apparatus serving as the parent node, and performs step S408 of determining whether a status in the connection response 60 is a "connection-allowed state". If the status is a connection-allowed state, the idle IoT apparatus is communicatively connected to the networked IoT apparatus serving as the parent node to join the IoT network (step S409). If a connection is not allowed (the connection response 60 indicates a "connection-rejected state"), returning to the beginning of steps (or step S401, or step S402, or step S404, not shown), and the foregoing steps are performed. In this way, the idle IoT apparatus may be authenticated according to the general standard protocol for wireless local area networks, and serves as the root node. In addition, authentication is performed according to the general standard protocol for wireless local area networks, and networking authentication is performed on the same networked IoT apparatus again or another scanned networked IoT apparatus is selected (for example, another networked IoT apparatus is selected from the candidate nodes) as the parent node to perform the network authentication procedure. Therefore, the idle IoT apparatus may continuously attempt to join the IoT network to ensure reliability of the IoT network.

Figure 5:
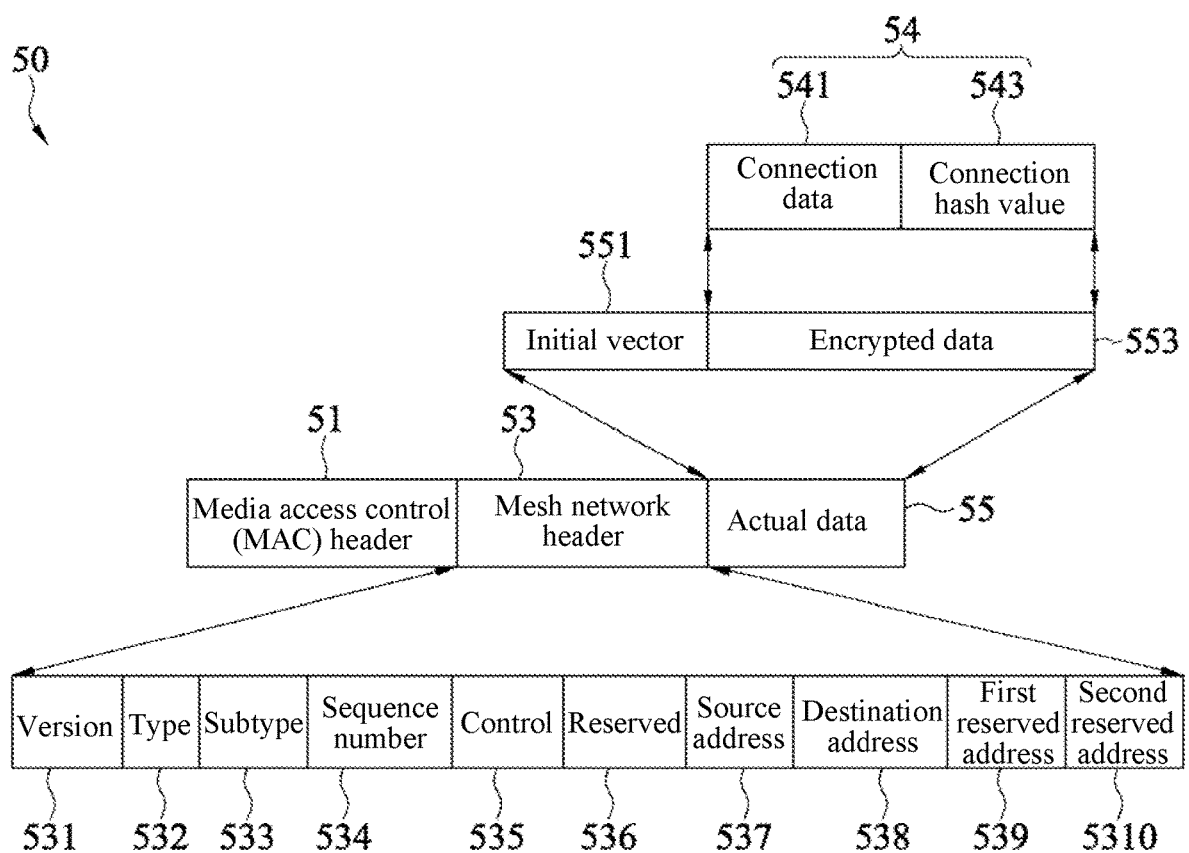
FIG. 5 shows a data packet format of a connection request ciphertext to be transmitted by an idle IoT apparatus according to an embodiment of the present invention.

The connection request ciphertext 50 is further described. Referring to FIG. 5, FIG. 5 shows a data packet format of a connection request ciphertext 50 to be transmitted by an idle IoT apparatus according to an embodiment of the present invention. The connection request ciphertext 50 includes a MAC header 51, a mesh network header 53, and actual data (payload) 55.

The MAC header 51 includes a MAC address of a source (that is, a MAC address of the idle IoT apparatus) and a MAC address of a destination (that is, a MAC address of the parent node), so that the idle IoT apparatus can send data to a correct destination.

The mesh network header 53 includes a version 531, a type 532, a subtype 533, sequence (seq) number 534, control (535), reserved (RSVD) 536, a source address (ADD0) 537, a destination address (ADD1) 538, a first reserved address (ADD2) 539, and a second reserved address (ADD3) 5310. Table 1 shows data description of the mesh network header 53.

TABLE 1

| Signal frame item | Data length (byte) | Function description |
| --- | --- | --- |
| Version: 531 | 2 | Mesh version |
| Type 532 | 1 | Mesh packet type |
| Subtype 533 | 1 | Mesh packet subtype |
| Sequence number 534 | 4 | Sequence number |
| Control 535 | 4 | Control |
| Reserved 536 | 4 | Reserved |
| Source address 537 | 6 | Source address |
| Destination address 538 | 6 | Destination address |
| First reserved address 539 | 6 | Reserved |
| Second reserved address 5310 | 6 | Reserved |

In some embodiments, the type 532 of the connection request ciphertext 50 may be a management state for performing a management function defined in the general standard for wireless local area networks, and the subtype 533 may be an association request instruction for notifying the networked IoT apparatus that there is an idle IoT apparatus to serve as a child node of the networked IoT apparatus.

In some embodiments, the source address 537 may be a source MAC address, and the destination address ADD1 may be a destination MAC address.

The actual data 55 includes an initial vector 551 and encrypted data 553. The encrypted data 553 is obtained by encrypting the connection request 54. The connection request 54 includes connection data 541 and a hash value (which is referred to as a connection hash value 543 below). In some embodiments, the connection hash value 543 is generated through a hash calculation based on the connection data 541. In some embodiments, the connection hash value 543 is generated through a hash calculation based on the initial vector 551 and the connection data 541. The hash calculation may use but not limited to, for example, an MD5 algorithm, an SHA-1 algorithm, etc. In some embodiments, the connection data 541 is a random number generated through a random function.

In some embodiments, the idle IoT apparatus may encrypt the connection request 54 by using a key same as that of the networked IoT apparatus (that is, symmetric encryption), for example, encrypt the connection request 54 by using an AES algorithm, a DES algorithm, a 3DES algorithm, a WEP algorithm, etc. to generate the encrypted data 553, and form the connection request ciphertext 50 by using the MAC header 51 and the mesh network header 53.

In some embodiments, the idle IoT apparatus includes an encryption key storage circuit and an encryption circuit. The encryption key storage circuit stores the key. The encryption circuit encrypts the connection request 54 according to the key to generate the connection request ciphertext 50. In some embodiments, the encryption key storage circuit and the encryption circuit may be programmable hardware, and the hardware executes software corresponding to an encryption program.

Figure 6:
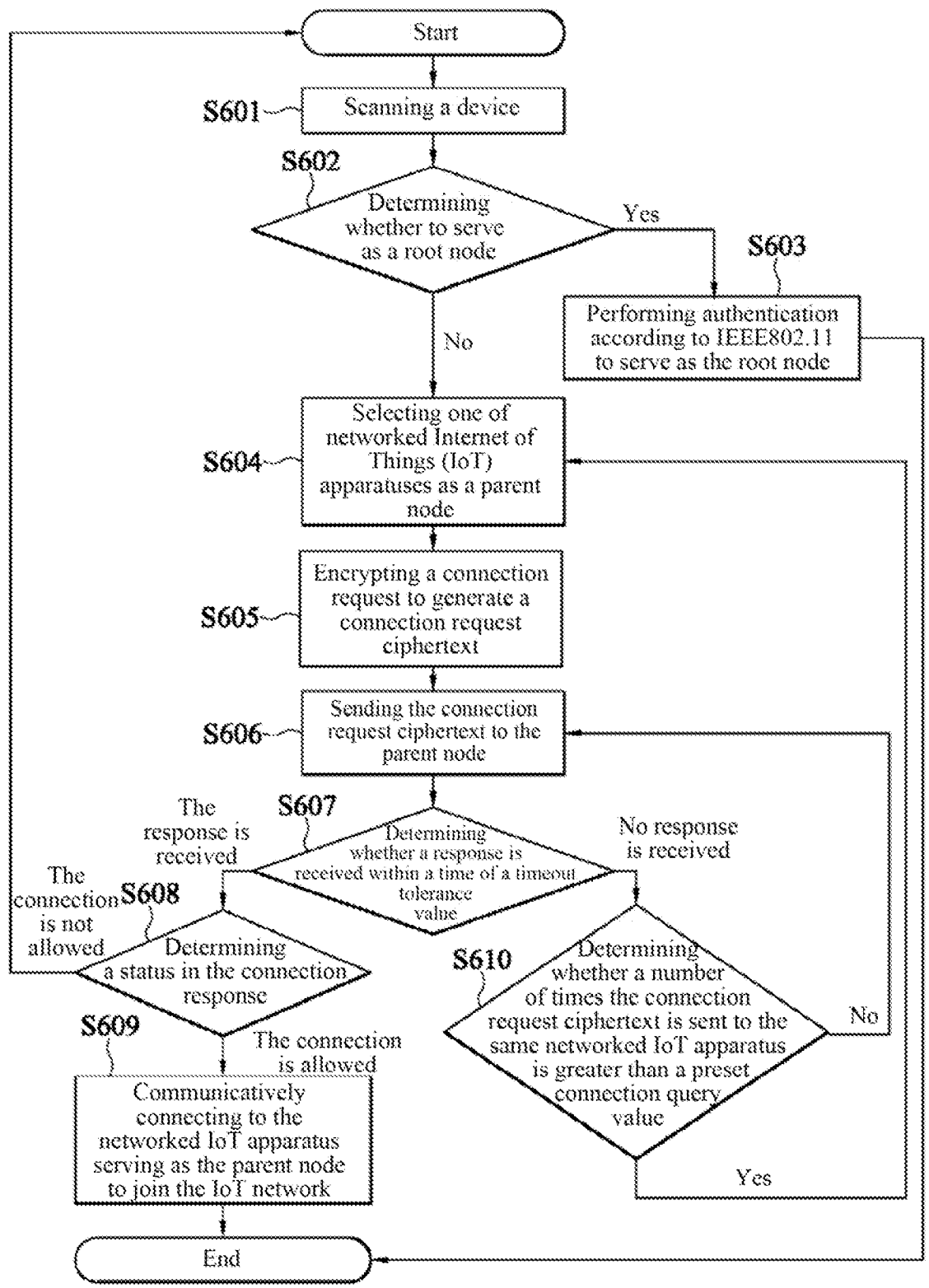
FIG. 6 is a flowchart of networking authentication of an idle IoT apparatus according to an embodiment of the present invention.

FIG. 6 is a flowchart of networking authentication of an idle IoT apparatus according to an embodiment of the present invention. Receiving, by the idle IoT apparatus, the connection response 60 returned by the networked IoT apparatus is further described herein. As shown in FIG. 6, different from step S407 shown in FIG. 4, in step S607, the idle IoT apparatus continuously waits for the response from the parent node and accumulates a response waiting time through a timer. When the connection response 60 returned by the networked IoT apparatus serving as the parent node is received before the response waiting time exceeds a timeout tolerance value, step S608 is performed, and the status in the connection response 60 is further determined as described above. Steps S608 to S609 are the same as steps S408 to S409, and therefore the descriptions are not repeated. If the connection response 60 returned by the networked IoT apparatus serving as the parent node is still not received and the response waiting time exceeds the timeout tolerance value, step S610 is performed. Since steps S601 to S606 are the same as steps S401 to S406, the descriptions are not repeated.

In step S610, the idle IoT apparatus determines whether a number of times the connection request ciphertext 50 is sent to the same networked IoT apparatus is greater than a preset connection query value. If the number is not greater than the preset connection query value, step S606 of resending the connection request ciphertext 50 to the same networked IoT apparatus is performed, and the subsequent steps are repeated. If the number is greater than the preset connection query value, step S604 of selecting another scanned networked IoT apparatus as the parent node is performed, and the subsequent steps are repeated. Therefore, the idle IoT apparatus may continuously attempt to join the IoT network to ensure reliability of the IoT network.

In some embodiments, step S610 may be omitted (not shown). For example, in step S607, if the idle IoT apparatus does not receive the connection response 60 when the response waiting time exceeds the timeout tolerance value, returning to the beginning of steps (or step S601, or step S602, or step S604, or step S606), and the subsequent steps are repeated.

After the networking is completed through the foregoing networking authentication process, a routing table stored by each node between a newly added node and the wireless access point 200 is updated. For example, the newly added IoT apparatus 100 transmits routing data to each node between the newly added IoT apparatus and the wireless access point 200 to update the routing table stored by each node. In this way, when data is to be transferred to the newly added node, the nodes may forward the data according to the updated routing tables, so that the newly added node can obtain the data.

Figure 7:
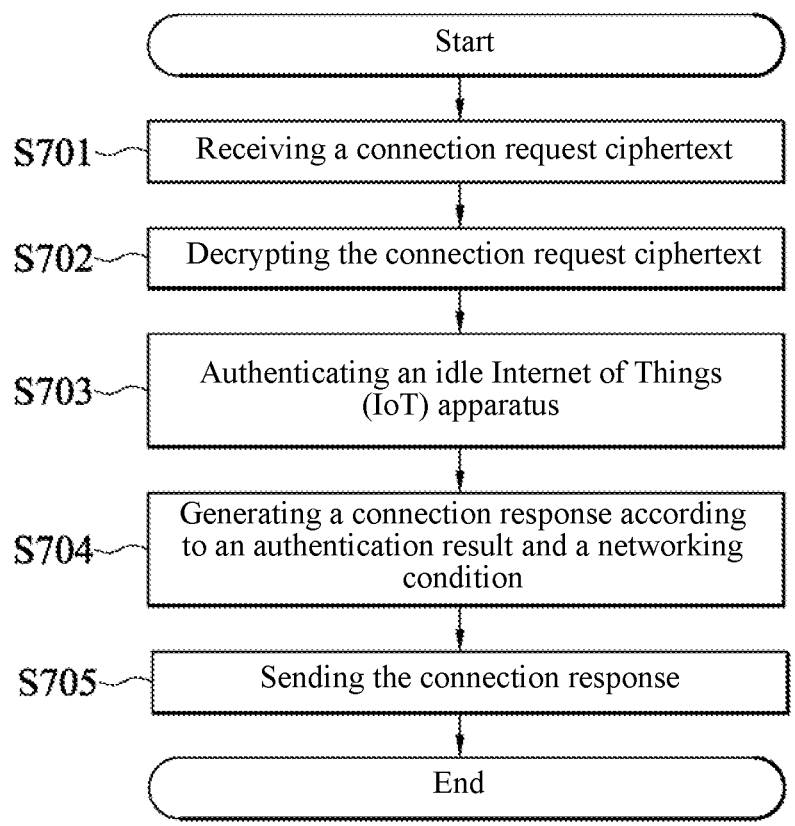
FIG. 7 is a flowchart of networking authentication performed by a networked IoT apparatus on an idle IoT apparatus according to an embodiment of the present invention.

FIG. 7 is a flowchart of networking authentication performed by a networked IoT apparatus on an idle IoT apparatus according to an embodiment of the present invention. First, the networked IoT apparatus serving as the parent node of the idle IoT apparatus receives the connection request ciphertext 50 from the idle IoT apparatus (step S701), and then performing step S702.

In step S702, the networked IoT apparatus decrypts the connection request ciphertext 50 according to the key to obtain the connection request 54. In some embodiments, the idle IoT apparatus and the networked IoT apparatus respectively obtain the same key. In some embodiments, the networked IoT apparatus may decrypt the connection request 54 by using a key same as that of the idle IoT apparatus (that, symmetric decryption), for example, decrypt the connection request ciphertext 50 by using an AES algorithm, a DES algorithm, a 3DES algorithm, a WEP algorithm, etc. to obtain the connection request 54.

In step S703: The networked IoT apparatus authenticates the idle IoT apparatus according to the connection request 54 to generate an authentication result. For example, the networked IoT apparatus performs a hash calculation on the obtained connection data 541 in the connection request 54 to generate a verification hash value, and determines whether the verification hash value and the connection hash value 543 are the same, so as to determine whether the data packet (the connection request ciphertext 50) transmitted by the idle IoT apparatus is tampered with and whether the key obtained by the networked IoT apparatus is the same as the key of the idle IoT apparatus. If the verification hash value and the connection hash value 543 are the same, it means that the data packet is not tampered with, and the keys used are the same. In this case, the authentication of the idle IoT apparatus succeeds. Otherwise, the authentication of the idle IoT apparatus does not succeed.

In some embodiments, the networked IoT apparatus may generate verification hash value by performing a hash calculation based on the initial vector 551 and the connection data 541. In some embodiments, the connection hash value 543 and the verification hash value are obtained by using the same hash algorithm (for example but not limited to an MD5 algorithm and an SHA-1 algorithm).

In some embodiments, the networked IoT apparatus includes a decryption key storage circuit and a decryption circuit. The decryption key storage circuit stores the key. The decryption circuit decrypts the connection request ciphertext 50 according to the key to obtain the connection request 54. In some embodiments, the decryption key storage circuit and the decryption circuit may be programmable hardware, and the hardware executes software corresponding to a decryption program.

In step S704, the networked IoT apparatus determines, according to the authentication result and a networking condition, whether to allow the idle IoT apparatus to join an IoT network so as to generate a connection response 60. Then, step S705 of outputting the connection response 60 to the idle IoT apparatus is performed. In some embodiments, if the authentication result is a success and the networking condition is met, a status in the connection response 60 of the networked IoT device is a "connection-allowed state". Otherwise, the status is a "connection-rejected state".

The networking condition includes the following: the networked IoT apparatus is a node with a data transfer capability in the IoT network, a number of child nodes of the networked IoT apparatus in the IoT network does not reach a child node number upper limit, and a number of hops between the networked IoT apparatus and a wireless access point 200 does not reach a tier upper limit. A node with the data transfer capability refers to a relay node type or a root node type. A node (that is, a leaf node type) without the data transfer capability cannot serve as the parent node of the idle IoT apparatus. In order to prevent a node from burdening an excessive amount of forwarded data, each parent node has an upper limit on a number of child nodes that are allowed to be connected to the parent node. If a number of connected child nodes reaches the upper limit, no more new IoT apparatus is allowed to be connected to the parent node as a child node of the parent node. In addition, each tree structure has a tier upper limit to avoid an excessively long data transfer time as a result of excessive hierarchies of the tree structure. If a number of hops between a networked IoT apparatus to which a connection is to be established and the wireless access point 200 reaches the tier upper limit, no more new IoT apparatus is allowed to be connected to the networked IoT apparatus as a child node of the networked IoT apparatus.

Figure 8:
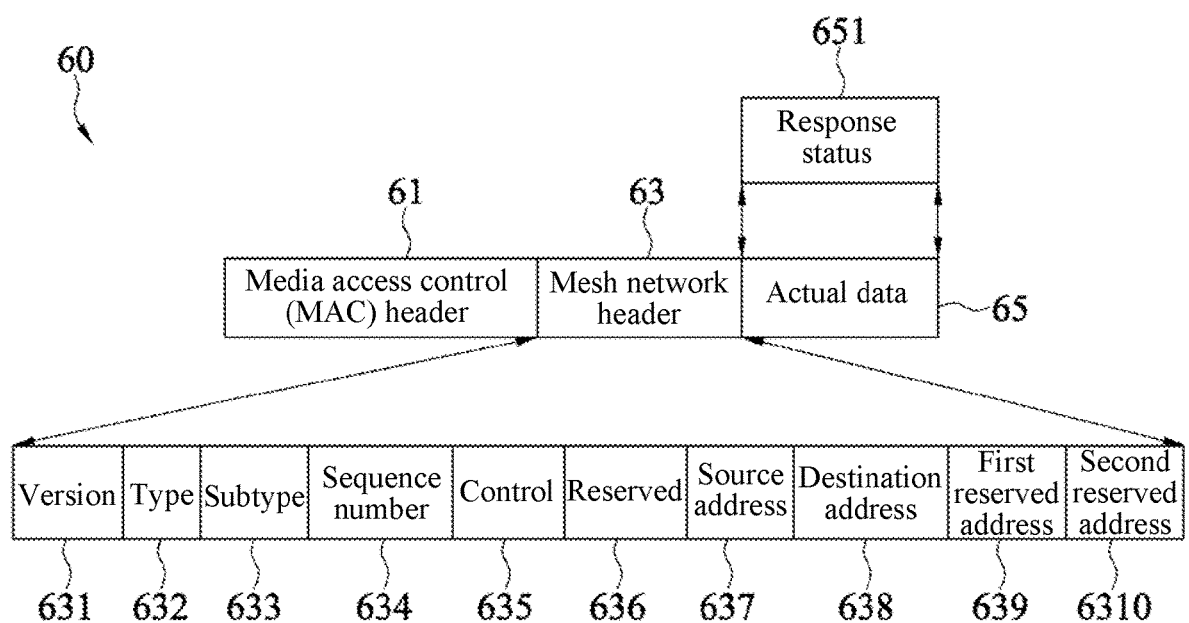
FIG. 8 shows a data packet format of a connection response to be transmitted by a networked IoT apparatus according to an embodiment of the present invention.

The connection response 60 is further described. FIG. 8 shows a data packet format of a connection response 60 to be transmitted by a networked IoT apparatus according to an embodiment of the present invention. In some embodiments, the connection response 60 includes a MAC header 61, a mesh network header 63, and actual data 65. The actual data 65 includes a response status 651. The MAC header 61 and the mesh network header 63 and formats included therein may have a packet format similar to those of a MAC header 61 and a mesh network header 63 and formats included therein of the connection request ciphertext 50. For example, the packet format of the mesh network header 63 may include a version 631, a type 632, a subtype 633, a sequence number 634, control 635, reserved 636, a source address 637, a destination address 638, a first reserved address 639, and a second reserved address 6310. The packet formats may be similar to the packet formats of the mesh network header 53 shown in FIG. 5, such as the version 531, the type 532, the subtype 533, the sequence number 534, the control 535, the reserved 536, the source address 537, the destination address 538, the first reserved address 539, and the second reserved address 5310.

In some embodiments, a source MAC address of the MAC header 61 is a MAC address of the networked IoT apparatus, and a destination MAC address of the MAC header 61 is a MAC address of the idle IoT apparatus. In some embodiments, the type 632 of the connection response 60 may be a management state for performing a management function defined in the general standard for wireless local area networks, and the subtype 633 may be an association response instruction which responds to an association request instruction sent by the idle IoT apparatus that is to serve as a child node of the networked IoT apparatus.

In some embodiments, if the status in the connection response 60 is a connection-allowed state, the response status 651 of the actual data 65 in the connection response 60 is high-level logical data. If the status in the connection response 60 is a connection-rejected state, the response status 651 of the actual data 65 in the connection response 60 is low-level logical data. However, the present invention is not limited thereto.

Therefore, according to some embodiments, the idle IoT apparatus and the networked IoT apparatus have the same key to encrypt and decrypt data transmission data, and the networked IoT apparatus can authenticate the idle IoT apparatus through the key same as that of the idle IoT apparatus, so that authentication and link establishment can be rapidly performed between the IoT apparatuses. In addition, since only a small amount of data needs to be transmitted to complete the authentication, the amount of data that needs to be transmitted to establish a link between the IoT apparatuses can be reduced.

What is claimed is:

1. An Internet of Things (IoT) networking authentication system, comprising:
an idle IoT apparatus including a first wireless network hardware module, a first processor and an encryption circuit, the encryption circuit configured to encrypt a connection request according to a key to generate a connection request ciphertext; and
the first wireless network hardware module configured to send the connection request ciphertext; and
a networked IoT apparatus including a second wireless network hardware module and a second processor and a decryption circuit, the decryption circuit configured to receive the connection request ciphertext and decrypt the connection request ciphertext according to the key to obtain the connection request, wherein the second processor is configured to authenticate the idle IoT apparatus according to the connection request to generate an authentication result, and to determine, according to the authentication result and a networking condition, whether to allow the idle IoT apparatus to join an IoT network so as to generate a connection response,
wherein the second wireless network hardware module is configured to output the connection response to the idle IoT apparatus,
wherein when the authentication result is that the authentication succeeds and the networking condition is met, the second processor of the networked IoT apparatus allows the idle IoT apparatus to join the IoT network, the networking condition comprising the following: the networked IoT apparatus is a node with a data transfer capability in the IoT network, a number of child nodes of the networked IoT apparatus in the IoT network does not reach a child node number upper limit, and a number of hops between the networked IoT apparatus and a wireless access point does not reach a tier upper limit,
wherein the first processor controls a first information authentication hardware module of the idle IoT apparatus to perform an authentication on a network configuration apparatus while the idle IoT apparatus is in a network configuration stage, and
the second processor controls a second information authentication hardware module of the networked IoT apparatus to perform the authentication on the network configuration apparatus while the networked IoT apparatus is in the network configuration stage,
wherein the network configuration apparatus respectively obtains a first authentication information from the idle IoT apparatus and the networked IoT apparatus in a first information obtaining manner and respectively obtains a second authentication information from the idle IoT apparatus and the networked IoT apparatus in a second information obtaining manner, and
the second information obtaining manner is different from the first information obtaining manner,
wherein the first information obtaining manner includes scanning and decoding a Quick Response (QR) code or using a short-range wireless communication protocol and the second information obtaining manner includes using a cloud server or user input,
wherein the first wireless network hardware module receives network configuration data from the network configuration apparatus when the first information obtaining manner and the second information obtaining manner of the idle IoT apparatus are the same or are corresponding to each other,
wherein the second wireless network hardware module receives the network configuration data from the network configuration apparatus when the first information obtaining manner and the second information obtaining manner of the networked IoT apparatus are the same or are corresponding to each other, wherein the first processor and the second processor respectively obtain the key according to the network configuration data.

2. The IoT networking authentication system according to claim 1, wherein the connection request comprises connection data and a connection hash value generated through a hash function according to the connection data, the second processor of the networked IoT apparatus generating a verification hash value through the hash function according to the connection data in the connection request, and comparing the verification hash value to the connection hash value to authenticate the idle IoT apparatus so as to generate the authentication result.

3. The IoT networking authentication system according to claim 2, wherein the connection data is a random number.

4. The IoT networking authentication system according to claim 1, wherein when the idle IoT apparatus sends the connection request ciphertext to the networked IoT apparatus, the first processor of the idle IoT apparatus accumulates a response waiting time through a timer and continuously waits for the networked IoT apparatus to output the connection response, and when the response waiting time exceeds a timeout tolerance value and the idle IoT apparatus does not receive the connection response, the first wireless network hardware module of the idle IoT apparatus resends the connection request ciphertext to the networked IoT apparatus.

5. The IoT networking authentication system according to claim 4, further comprising another networked IoT apparatus, wherein when a number of times the first wireless network hardware module of the idle IoT apparatus sends the connection request ciphertext to the networked IoT apparatus is greater than a preset connection query value, the first wireless network hardware module of the idle IoT apparatus sends the connection request ciphertext to the another networked IoT apparatus.

6. The IoT networking authentication system according to claim 1, wherein the idle IoT apparatus further comprises: an encryption key storage circuit configured to store the key; and the networked IoT apparatus further comprises: a decryption key storage circuit configured to store the key.

7. The IoT networking authentication system according to claim 1, further comprising another networked IoT apparatus, wherein when a status in the connection response is a connection-allowed state, the idle IoT apparatus is communicatively connected to the networked IoT apparatus, and when the status in the connection response is a connection-rejected state, the first wireless network hardware module of the idle IoT apparatus sends the connection request ciphertext to the another networked IoT apparatus.

8. The IoT networking authentication system according to claim 7, wherein when the idle IoT apparatus is communicatively connected to the networked IoT apparatus, the first wireless network hardware module of the idle IoT apparatus transfers routing data to the networked IoT apparatus.

9. The IoT networking authentication system according to claim 1, wherein there are a plurality of networked IoT apparatuses communicatively connected to a wireless access point through a tree topology to form a plurality of tree structures.

10. An Internet of Things (IoT) networking authentication method, comprising:

performing, by a first information authentication module of an idle IoT apparatus, an authentication on a network configuration apparatus while the idle IoT apparatus is in a network configuration stage;

performing, by a second information authentication module of a networked IoT apparatus, the authentication on the network configuration apparatus while the networked IoT apparatus is in the network configuration stage, wherein the network configuration apparatus respectively obtains a first authentication information from the idle IoT apparatus and the networked IoT apparatus in a first information obtaining manner and respectively obtains a second authentication information from the idle IoT apparatus and the networked IoT apparatus in a second information obtaining manner, and the second information obtaining manner is different from the first information obtaining manner, wherein the first information obtaining manner includes scanning and decoding a Quick Response (QR) code or using a short-range wireless communication protocol and the second information obtaining manner includes using a cloud server or user input;

receiving, by a first wireless network module of the idle IoT apparatus, network configuration data from the network configuration apparatus when the first information obtaining manner and the second information obtaining manner of the idle IoT apparatus are the same or are corresponding to each other;

receiving, by a second wireless network module of the networked IoT apparatus, the network configuration data from the network configuration apparatus when the first information obtaining manner and the second information obtaining manner of the networked IoT apparatus are the same or are corresponding to each other;

obtaining, by a first processor of the idle IoT apparatus and a second processor of the networked IoT apparatus respectively, a key according to the network configuration data;

encrypting, by an encryption circuit of the idle IoT apparatus, a connection request according to the key to generate a connection request ciphertext, wherein the encryption circuit is implemented by the first processor;

sending, by the first wireless network module of the idle IoT apparatus, the connection request ciphertext to the networked IoT apparatus;

decrypting, by a decryption circuit of the networked IoT apparatus, the connection request ciphertext according to the key to obtain the connection request, wherein the decryption circuit is implemented by the second processor;

authenticating, by the second processor of the networked IoT apparatus, the idle IoT apparatus according to the connection request to generate an authentication result;

determining, by the second processor of the networked IoT apparatus according to the authentication result and a networking condition, whether to allow the idle IoT apparatus to join an IoT network so as to generate a connection response; and outputting, by the second wireless network module of the networked IoT apparatus, the connection response to the idle IoT apparatus, wherein when the authentication result is that the authentication succeeds and the networking condition is met, the second processor of the networked IoT apparatus allows the idle IoT apparatus to join the IoT network, the networking condition comprising the following: the networked IoT apparatus is a node with a data transfer capability in the IoT network, a number of child nodes of the networked IoT apparatus in the IoT network does not reach a child node number upper limit, and a number of hops between the networked IoT apparatus and a wireless access point does not reach a tier upper limit.

11. The IoT networking authentication method according to claim 10, wherein the connection request comprises connection data and a connection hash value generated through a hash function according to the connection data, the authenticating, by the second processor of the networked IoT apparatus, the idle IoT apparatus according to the connection request to generate an authentication result further comprising: generating, by the second processor of the networked IoT apparatus, a verification hash value through the hash function according to the connection data in the connection request; and comparing, by the second processor of the networked IoT apparatus, the verification hash value to the connection hash value to authenticate the idle IoT apparatus so as to generate the authentication result.

12. The IoT networking authentication method according to claim 11, wherein the connection data is a random number.

13. The IoT networking authentication method according to claim 10, further comprising: when the idle IoT apparatus sends the connection request ciphertext to the networked IoT apparatus, accumulating a response waiting time through a timer and continuously waiting, by the first processor of the idle IoT apparatus, for the networked IoT apparatus to output the connection response; and when the response waiting time exceeds a timeout tolerance value and the idle IoT apparatus does not receive the connection response, resending, by the first wireless network module of the idle IoT apparatus, the connection request ciphertext to the networked IoT apparatus.

14. The IoT networking authentication method according to claim 13, wherein the IoT network further comprises another networked IoT apparatus, and the IoT networking authentication method further comprises: when a number of times the idle IoT apparatus sends the connection request ciphertext to the networked IoT apparatus is greater than a preset connection query value, sending, by the first wireless network module of the idle IoT apparatus, the connection request ciphertext to the another networked IoT apparatus.

15. The IoT networking authentication method according to claim 10, wherein the IoT network further comprises another networked IoT apparatus, and the IoT networking authentication method further comprises: when a status in the connection response is a connection-allowed state, communicatively connecting the idle IoT apparatus to the networked IoT apparatus; and when the status in the connection response is a connection-rejected state, sending, by the first wireless network module of the idle IoT apparatus, the connection request ciphertext to the another networked IoT apparatus.

16. The IoT networking authentication method according to claim 15, further comprising: when the idle IoT apparatus is communicatively connected to the networked IoT apparatus, transferring, by the first wireless network module of the idle IoT apparatus, routing data to the networked IoT apparatus.

* * * * *